US007003775B2

(12) United States Patent
Lacombe et al.

(10) Patent No.: US 7,003,775 B2
(45) Date of Patent: Feb. 21, 2006

(54) HARDWARE IMPLEMENTATION OF AN APPLICATION-LEVEL WATCHDOG TIMER

(75) Inventors: John Lacombe, Austin, TX (US); Theodore F. Emerson, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 704 days.

(21) Appl. No.: 09/932,541

(22) Filed: Aug. 17, 2001

(65) Prior Publication Data

US 2003/0037172 A1 Feb. 20, 2003

(51) Int. Cl.

| | |
|---|---|
| ***G06F 3/00*** | (2006.01) |
| ***G06F 9/44*** | (2006.01) |
| ***G06F 9/46*** | (2006.01) |
| ***G06F 13/00*** | (2006.01) |

(52) U.S. Cl. ...................... 719/313; 719/314; 715/717; 713/502; 713/600

(58) Field of Classification Search ........ 719/310–320, 719/321, 327; 713/500–601, 1; 714/55, 714/10–24; 370/242

See application file for complete search history.

(56) References Cited

U.S. PATENT DOCUMENTS

| | | | | | |
|---|---|---|---|---|---|
| 4,072,852 | A | * | 2/1978 | Hogan et al. | 714/15 |
| 4,099,255 | A | * | 7/1978 | Stanley et al. | 710/262 |
| 4,513,417 | A | * | 4/1985 | Lamb et al. | 714/15 |
| 4,538,273 | A | * | 8/1985 | Lasser | 714/23 |
| 4,586,179 | A | * | 4/1986 | Sirazi et al. | 714/22 |
| 4,594,685 | A | * | 6/1986 | Owens | 714/23 |
| 4,627,060 | A | * | 12/1986 | Huang et al. | 714/36 |
| 4,635,187 | A | * | 1/1987 | Baron et al. | 718/100 |
| 4,696,002 | A | * | 9/1987 | Schleupen et al. | 714/23 |
| 4,763,296 | A | * | 8/1988 | Gercekci | 714/55 |
| 4,803,682 | A | * | 2/1989 | Hara et al. | 714/23 |
| 4,879,647 | A | * | 11/1989 | Yazawa | 714/55 |
| 4,956,807 | A | * | 9/1990 | Hosaka et al. | 714/55 |
| 5,333,285 | A | * | 7/1994 | Drerup | 714/23 |
| 5,390,324 | A | * | 2/1995 | Burckhartt et al. | 714/23 |
| 5,404,356 | A | * | 4/1995 | Abe | 714/55 |
| 5,747,641 | A | * | 5/1998 | Frankel et al. | 530/300 |
| 5,748,882 | A | * | 5/1998 | Huang | 714/47 |
| 5,774,649 | A | * | 6/1998 | Goh | 714/55 |
| 5,978,911 | A | * | 11/1999 | Knox et al. | 713/1 |
| 5,978,912 | A | * | 11/1999 | Rakavy et al. | 713/2 |
| 5,978,939 | A | * | 11/1999 | Mizoguchi et al. | 714/55 |
| 6,009,521 | A | * | 12/1999 | Huang | 713/1 |

(Continued)

OTHER PUBLICATIONS

Maquelin et al., "Polling Watchdog: Combining Polling and Interrupts for Efficient Message Handling" ACM 0-89791-786-3/96/0005, 1996, pp. 179-188.*

*Primary Examiner*—Majid Banankhah

(57) ABSTRACT

An application watchdog, comprising a dedicated watchdog counter in the hardware layer and a watchdog driver operating in the kernel mode layer of the computer operating system. The driver comprises a system thread configured to monitor a plurality of designated user applications operating in the user mode of the operating system and a message passing interface for receiving periodic signals from each of the user applications. The driver also uses an interface for transmitting timer reset commands to the dedicated watchdog counter. If the system thread receives a message from each of the designated user applications within an allotted period of time, the watchdog driver sends a timer reset command to the dedicated watchdog counter. Otherwise, the dedicated watchdog counter fails to receive the reset command and subsequently issues a system reset command. Early warning signals may be issued prior to system reset to alert system management.

26 Claims, 6 Drawing Sheets

U.S. PATENT DOCUMENTS

| | | | | |
|---|---|---|---|---|
| 6,026,454 | A * | 2/2000 | Hauck et al. | 710/65 |
| 6,112,320 | A * | 8/2000 | Dien | 714/51 |
| 6,141,774 | A * | 10/2000 | Mattheis | 714/27 |
| 6,266,781 | B1 * | 7/2001 | Chung et al. | 714/4 |
| 6,393,589 | B1 * | 5/2002 | Smit et al. | 714/55 |
| 6,393,590 | B1 * | 5/2002 | Wood et al. | 714/55 |
| 6,505,298 | B1 * | 1/2003 | Cerbini et al. | 713/1 |
| 6,560,726 | B1 * | 5/2003 | Vrhel et al. | 714/55 |
| 6,615,312 | B1 * | 9/2003 | Hamlin et al. | 711/112 |
| 6,665,758 | B1 * | 12/2003 | Frazier et al. | 710/200 |
| 6,754,855 | B1 * | 6/2004 | Denninghoff et al. | 714/48 |
| 6,799,318 | B1 * | 9/2004 | Davison et al. | 719/328 |
| 6,850,257 | B1 * | 2/2005 | Colleran et al. | 715/804 |
| 2001/0044339 | A1 * | 11/2001 | Cordero et al. | 463/42 |
| 2002/0162053 | A1 * | 10/2002 | Os | 714/38 |
| 2002/0184482 | A1 * | 12/2002 | Lacombe et al. | 713/1 |
| 2004/0244014 | A1 * | 12/2004 | Davison et al. | 719/321 |

* cited by examiner

APPLICATION WATCHDOG
TIMER VALUE REGISTER

700

| LOC | BIT | READ/WRITE | RESET | DESCRIPTION |
|---|---|---|---|---|
| 15:0 | COUNT | R/W | 0 | TIMER CLEAR VALUE |

APPLICATION WATCHDOG TIMER
CONTROL/STATUS REGISTER

710

| LOC | BIT | READ/WRITE | RESET | DESCRIPTION |
|---|---|---|---|---|
| 7 | NMISTAT | R/W | 0 | Warning NMI Status |
| 6 | SMISTAT | R/W | 0 | Warning SMI Status |
| 5:4 | RESERVED | R | 0 | RESERVED |
| 3 | SMIEN | R/W | 0 | Warning SMI Enable |
| 2 | NMIEN | R/W | 0 | Warning NMI Enable |
| 1 | RELOAD | W | 0 | Timer Clear |
| 0 | ENABLE | R/W | 0 | Count Enable |

Fig. 7

HARDWARE IMPLEMENTATION OF AN APPLICATION-LEVEL WATCHDOG TIMER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to watchdog timers for personal computer systems. More specifically, the preferred embodiment relates to the use of an application watchdog timer to monitor the uptime of individual applications running on a computer system.

2. Background of the Invention

Watchdog circuits are rather common in modem computer systems. A watchdog circuit is one way of creating a stable computing platform. In fact, when one speaks of a stable, robust computer system, the watchdog circuit is indirectly one of the reasons that the system has these attributes. Computer designers rely on the watchdog circuit to reset the system in the unfortunate event something goes wrong. If a computer system hangs or locks up, the watchdog circuit can perform a number of tasks, including logging error information, checking memory, and rebooting the system so the computer will be up and running again in a short amount of time.

A watchdog circuit typically is a timing circuit that measures a certain system activity or activities. If the system activity does not occur within a prescribed timer period, the watchdog circuit generates an output signal indicating that the activity has not occurred. In its simplest form, the watchdog timer insures that the system is operational. Modem watchdog circuits are capable of performing a variety of tasks, but the heart of a watchdog timer is essentially just a counter. The timer continually counts up or down using the system clock towards a predetermined value until one of two things happen. First, the counter can be cleared so that the amount of time required to count to the predetermined value is pushed back to the maximum value. For example, if a timer counts from a maximum value of 300 seconds towards a minimum value of zero seconds, then when the timer is cleared, the clock will revert back to the maximum value and continue counting down from 300 seconds. The clear command (sometimes referred to as "hitting the watchdog") is typically issued by the operating system ("OS"). Programmers will insert commands in the OS code instructing the OS to periodically hit the watchdog. Thus, as long as the OS is operating as intended, the watchdog timer will be cleared periodically and the timer never reaches the predetermined value.

The second thing that may happen as the watchdog timer is running is that the counter actually does reach the predetermined value. This obviously occurs if the watchdog is never hit and the timer is never cleared. In this case, the watchdog timer will issue a reset command to the system and the computer will reboot. This type of automatic recovery is particularly helpful in unmanned computer systems. Obviously, if a user is working at a computer system and the OS becomes unresponsive, the user can initiate the reset procedure themselves. If, on the other hand, the computer is generally unmanned and working as a server in a computer network, it may not be readily obvious that the computer has ceased normal operations. The first person affected by such a condition will likely be a network user who discovers that they can't access a network database or perhaps their email. Thus, if a server becomes inoperative, the watchdog timer guarantees that the system will be up and running again in a short amount of time.

In their present configuration, conventional watchdog timers are certainly useful for their intended purpose. However, there are a number of drawbacks that can be improved upon by a more modem approach. From the perspective of server customers, the health of the OS is not necessarily the most important aspect of a network server. More often than not, a server actually exists to run a specific application and the proper operation of that application is the most important goal for the customer. Thus, if the key application or applications cease operation, but the OS effectively continues, the system will never reset and the customer experiences unwanted downtime.

Software solutions to the problem of monitoring applications have been proposed, but these implementations often require the existence of a separate watchdog application or service. Furthermore, these existing methods for monitoring applications are not robust as they require the watchdog application and the operating system to be operating correctly. A more efficient solution to this problem is to provide a hardware watchdog timer that is dedicated to the applications. This hardware is separate from the system watchdog timer and is capable of resetting the system in the event a key application becomes unresponsive. Likewise, if the OS is unresponsive, the system watchdog timer will also recover the application by forcing a system reset. In either case, the application and OS are fully monitored and system uptime is maximized.

It is desirable therefore, to develop an application-level watchdog timer that is capable of monitoring key applications and resetting the computer system in the event the applications become unresponsive. The application-level watchdog timer may work in conjunction with a level watchdog timer to provide a staggered level of protection that may advantageously improve computer server uptime.

BRIEF SUMMARY OF THE INVENTION

The problems noted above are solved in large part by an application watchdog, comprising a dedicated watchdog counter located in the hardware layer of a computer system and a watchdog driver operating in the kernel mode layer of the computer operating system. The watchdog driver comprises a system thread configured to monitor a plurality of designated user applications operating in the user mode of the computer operating system and a communication interface for transmitting a timer reset command to the dedicated watchdog counter. The watchdog driver uses a message passing interface for receiving periodic signals from each of the user applications.

If the system thread receives a message from each of the designated user applications within an allotted period of time, the watchdog driver sends a timer reset command to the dedicated watchdog counter. If the system thread does not receive a message from each of the designated user applications within the allotted period of time, the watchdog driver does not send a timer reset command to the dedicated watchdog counter. If the watchdog counter receives a timer reset command from the watchdog driver, the counter is reset to begin counting down from the maximum allotted period of time. However, if the watchdog counter does not receive the timer reset command from the watchdog driver, the counter is configured to restart the computer system when the counter expires.

The watchdog counter further comprises a timer value register that stores a digital representation of the maximum allotted period of time and a control and status register that comprises several different bit fields: a bit for enabling the application watchdog, a bit for counter reset, bit fields for enabling early expiration warnings, and bit fields for early expiration warning signals. If the early expiration warnings are enabled, the counter is configured to transmit early expiration warnings to the rest of the computer system before the counter expires. These early warning messages may be maskable, non-maskable or system management interrupts sent to notify the system management software or firmware and are preferably delivered 9 seconds prior to system reset.

The application watchdog operates in conjunction with a conventional system watchdog that is configured to monitor the computer operating system for periodic activity. Both the application watchdog and the system watchdog are configured to reset the computer system such that if either watchdog does not receive a timer reset command within an allotted period of time, that watchdog may issue a system reset command. Alternatively, the watchdog devices may initiate a restart of the operating system or of individual applications. The watchdog devices may operate independent of one another with each device being selectably enabled and each capable of issuing a reset command.

Initialization of the watchdog driver comprises loading the watchdog driver as the operating system loads following a computer system boot and loading and creating an initial input/output control signal interface that establishes the message passing interface between the designated applications and the watchdog driver. The computer applications then initialize and register with the watchdog service. This process involves linking the application with a dynamic link library and calling the watchdog driver via the dynamic link library and through the initial input/output control signal interface to validate the message passing interface. The application preferably sends address and identification information to the watchdog driver. Lastly, the watchdog timer device is initialized by setting the timer initialization value in the timer value and setting the counter enable bit and early warning enable bits in the control/status register.

BRIEF DESCRIPTION OF THE DRAWINGS

For a detailed description of the preferred embodiments of the invention, reference will now be made to the accompanying drawings in which:

FIG. 7 shows a the contents of the timer and control/status registers used in the preferred embodiment.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 1:
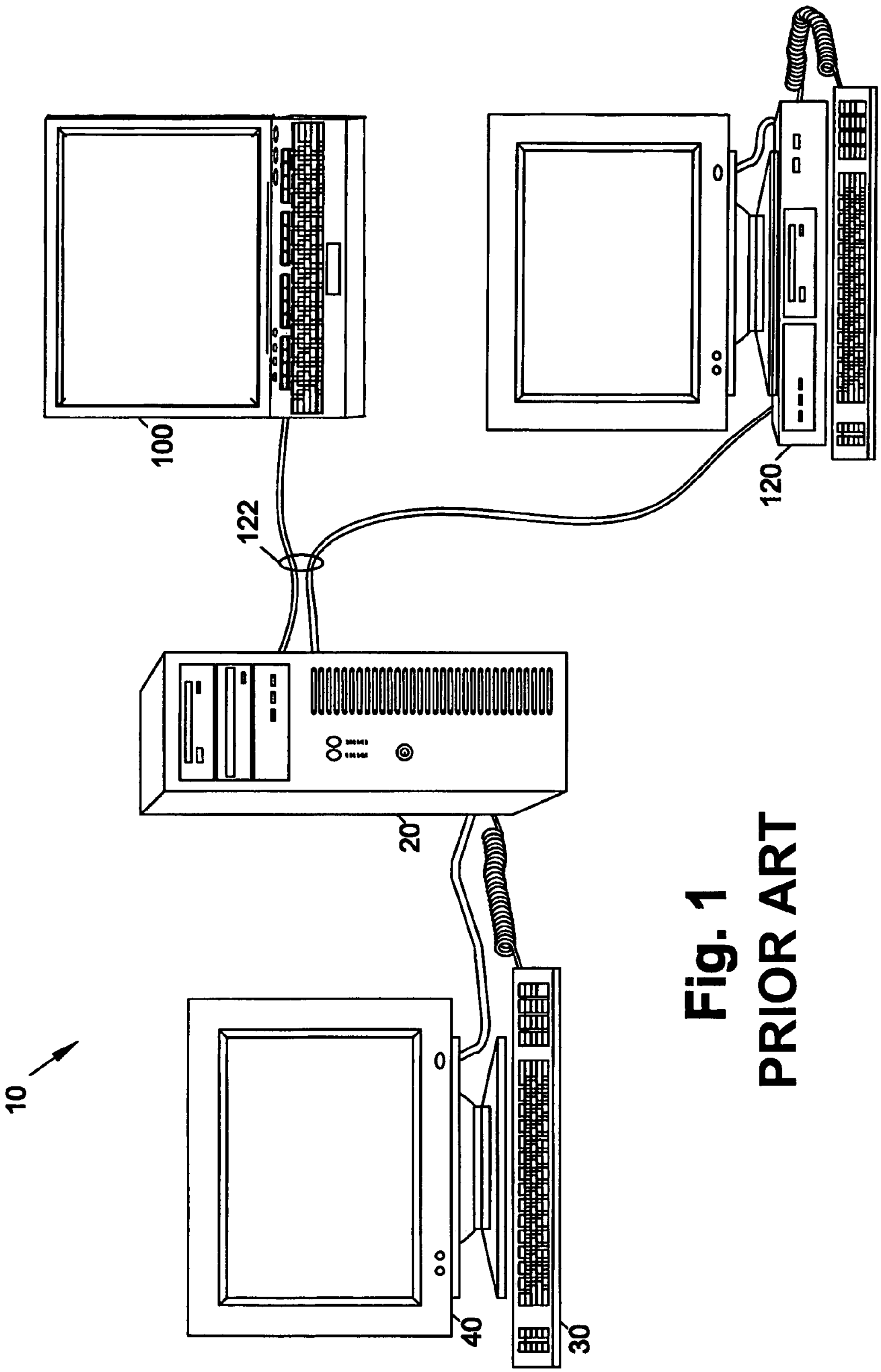
FIG. 1 shows a simple computer network comprising a computer system in which the preferred embodiment may be implemented.

Turning now to the figures, FIG. 1 shows an example of a simple computer network 10 comprising a plurality of computers. At least one of the computers 20 operates as a central server providing data to the other node computers 100, 120, which are connected to the same network 10. The central server 20 is coupled to the first computer 100 and the second computer 120 by network connections 122. Various other network components such as hubs, switches, modems, and routers may be included in the network 10, but are not shown in FIG. 1. It is envisioned server 20 incorporates the preferred embodiment of the invention. Computers 100, 120 may preferably be "client" computers and may also implement the preferred embodiment. Although a client/server configuration is shown, the computer network may also be an enterprise network, a peer network, a wide area network, a web network or any other suitable network configuration.

The central server 20 preferably includes at least one input device such as a keyboard 30 and at least one output device such as a monitor 40. Other I/O devices such as a mouse, printer, keyboard, and speakers are certainly permissible and are perhaps desirable peripheral components.

Users working on computers 100, 120 may remotely access data such as file databases or software applications located on the server 20. Alternatively, software applications may be loaded and run directly on the computers 100, 120, but licenses for the authorized use thereof are located on the central server 20. In either event, if a key application that is needed to provide data from the central server 20 to the network computers 100, 120 becomes unresponsive, that data will become unavailable and users on the network will be inconvenienced.

It can be appreciated therefore, that the ability to restart a server 20 if a key application becomes unresponsive provides certain advantages. The biggest advantage derives from the fact that an application failure may not result in an operating system failure. The preferred embodiment provides protection against this undesirable scenario and ensures that the network users are not inconvenienced for an unreasonably lengthy period of time.

Figure 2:
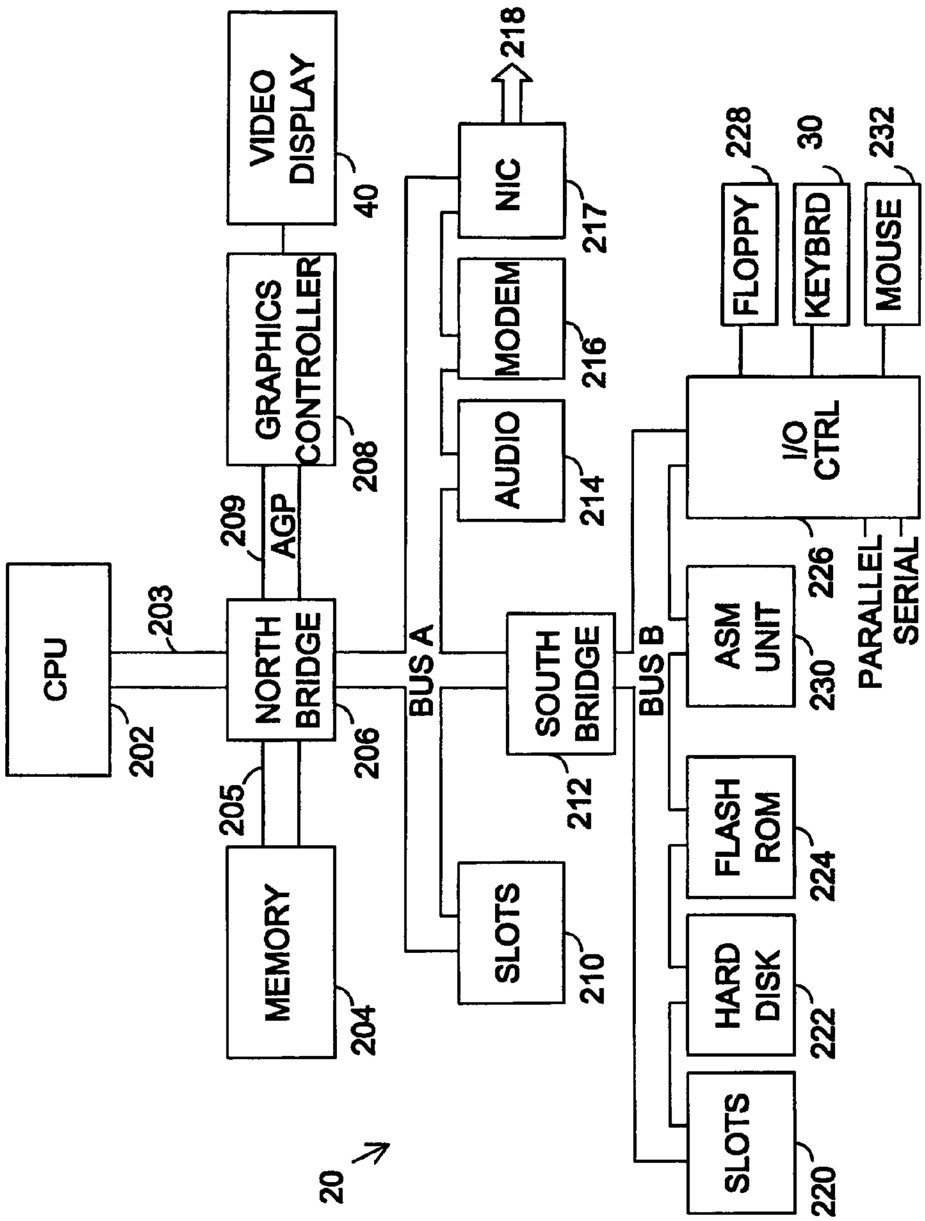
FIG. 2 shows a block diagram of a computer system in which the preferred embodiment may be implemented.

Referring now to FIG. 2, a representative computer server system is illustrated. It is noted that many other representative configurations exist and that this embodiment is described for illustrative purposes. For the following discussion, the computer system of FIG. 2 is assumed to represent server computer 20, but one of skill in the art will recognize that the preferred embodiment may be implemented as part of any computer system. The computer system 20 of FIG. 2 preferably includes multiple CPUs 202 coupled to a bridge logic device 206 via a CPU bus 203. The bridge logic device 206 is sometimes referred to as a "North bridge" for no other reason than it often is depicted at the upper end of a computer system drawing. The North bridge 206 also preferably comprises a memory controller to access and control a main memory array 204 via a memory bus 205. The North bridge 206 couples CPUs 202 and memory 204 to each other and to various peripheral devices in the system via one or more high-speed, narrow, source-synchronous expansion buses such as a Fast I/O bus and a Legacy I/O bus. The North bridge 206 can couple additional "high-speed narrow" bus links other than those shown in FIG. 2 to attach other bridge devices and other buses such as a PCI-X bus segment to which additional peripherals such as a 1 Gigabit Ethernet adapter may be coupled. The embodiment shown in FIG. 2 is not intended to limit the scope of possible server architectures.

The Fast I/O bus shown in FIG. 2 may be coupled to the North bridge 206. In this preferred embodiment, the Fast I/O bus attaches an I/O bridge 214 that provides access to a high-speed 66 Mhz, 64-bit PCI bus segment. A SCSI controller 215 preferably resides on this high speed PCI bus and controls multiple fixed disk drives 222. The high speed PCI bus also provides expansion slots 216 that permit coupling of peripheral devices that comply with the high speed PCI bus.

The Legacy P/O bus is preferably used to connect legacy peripherals and a primary PCI bus via a separate bridge logic device 212. This bridge logic 212 is sometimes referred to as a "South bridge" reflecting its location vis-a-vis the North bridge 206 in a typical computer system drawing. An example of such bridge logic is described in U.S. Pat. No. 5,634,073, assigned to Compaq Computer Corporation. The South bridge 212 provides access to the system ROM 213 and provides a low-pin count ("LPC") bus to legacy peripherals coupled to an I/O controller 226. The I/O controller 226 typically interfaces to basic input/output devices such as a floppy disk drive 228, a keyboard 30, a mouse 232 and, if desired, various other input switches such as a power switch and a suspend switch (not shown). The South bridge 212 also may provide one or more expansion buses, but preferably provides a 32-bit 33 Mhz PCI bus segment on which various devices are disposed. It should be noted that the Legacy I/O bus may be narrower than other "high speed narrow" buses if it only needs to satisfy the bandwidth requirements of peripherals disposed on the 33 Mhz, 32-bit PCI bus segment.

Various components that comply with the bus protocol of the 33 Mhz, 32-bit PCI bus may reside on this bus, such as a video controller 208 and a network interface card ("NIC") 217. The video controller 208 preferably drives a video display device 40 while NIC 217 is coupled to a network 218 for communication with other computers. These components may be integrated onto the motherboard as presumed by FIG. 2, or they may be plugged into expansion slots 210 that are connected to the PCI bus. In addition to the NIC 217 and video controller 208, an Advanced Server Management ("ASM") unit 230 is also disposed on the 33 Mhz, 32-bit PCI bus. The ASM unit 230 includes a system watchdog of the type that is found in many conventional computer systems. An example of such a watchdog is the Automatic Server Recovery ("ASR") watchdog found in some Compaq Computer Corporation servers. In the preferred embodiment, the application watchdog is also located on the ASM unit 230. A more detailed description of the ASM unit 230 is provided below in the discussion of FIG. 3.

Figure 3:
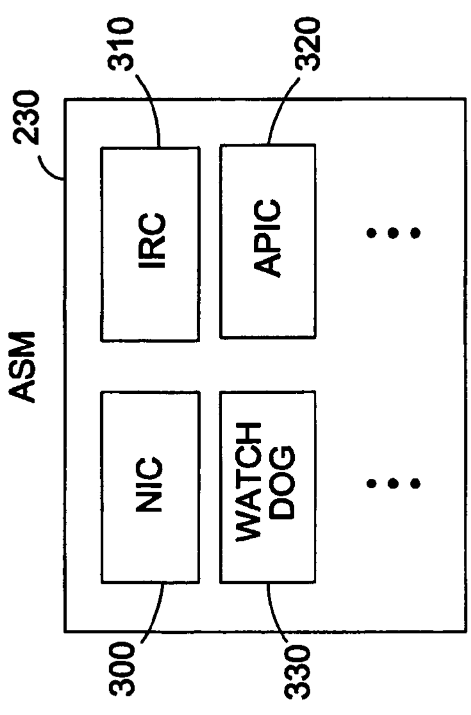
FIG. 3 shows a simplified ASM unit on which the preferred embodiment may be implemented.

FIG. 3 represents a simplified block diagram showing some of the various functions provided by the ASM unit 230 in the preferred embodiment. The ASM is a multipurpose management ASIC chip that provides various management facilities in addition to the watchdog device 330. In the preferred embodiment, the ASM ASIC includes an I/O CPU (or I/O processor) 320 that is used to provide intelligent control of the management architecture in the server 20. In addition to the CPU 320, the ASM 230 also preferably includes one or more out-of-band communication interfaces such as a Network Interface 300 and/or serial port device (not shown). These communication interfaces 300 permit out-of-band communication with the ASM 230 to enable remote monitoring, control, and detection of various system management events, including those generated by the watchdog device 330.

The ASM 230 also preferably includes an Integrated Remote Console ("IRC") 310. The IRC 310 provides the hardware facilities necessary to enable system management firmware, preferably executing on the CPU 320, to redirect console input (e.g., keyboard 30 and mouse 232) as well as console output 40 on the managed server 20 to a remote authorized user through one of the out-of-band communication interfaces 300 mentioned above.

The last function shown in FIG. 3 is the Watchdog device 330, which incorporates a conventional system watchdog timer as well as the application watchdog timer in accordance with the preferred embodiment. The ASM unit 230 may also perform any number of additional tasks including system support functions and providing UART serial communication capabilities (not shown). In short, the ASM unit 230 is a design specific device that is fully configurable to a design engineer's requirements. The preferred embodiment of the application watchdog is just one of many functions that are executed by the ASM unit 230.

Figure 4:
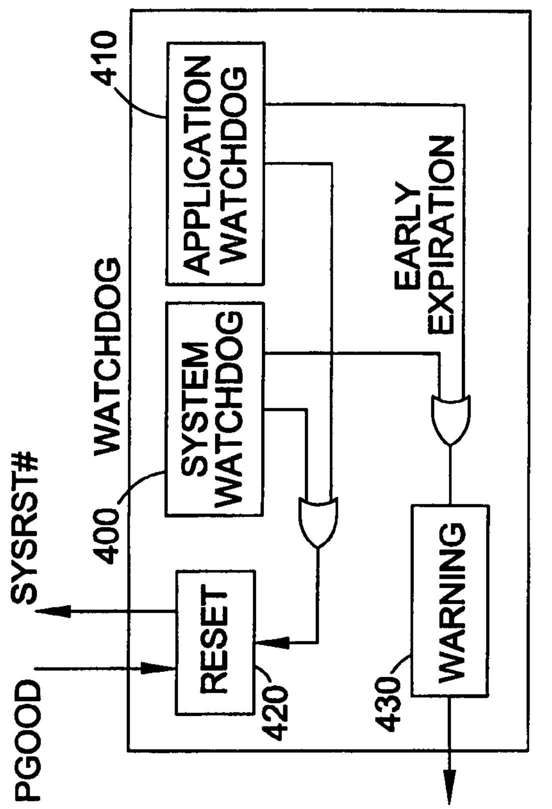
FIG. 4 provides a block diagram showing the implementation of the preferred embodiment with a conventional system watchdog timer.

As mentioned above, the application watchdog timer supplements a conventional system watchdog timer. The interrelation of the two watchdog timers is shown in FIG. 4. In FIG. 4, the system watchdog 400 and the application watchdog 410, each operate as a conventional watchdog, counting down from some predetermined reset value until the watchdog is either cleared or until the timer reaches its final value, thus triggering a system reset command ("SYSRST#"). The system watchdog 400 responds to clear commands from the operating system whereas the application watchdog responds to clear commands from individual computer applications. The watchdog timer also monitors a PGOOD power supply signal, which indicates the computer power supply is operating as expected. If either watchdog timer 400, 410 is not cleared (by the operating system or by the applications) in the predetermined reset time or if the PGOOD signal is not valid, a system reset command SYSRST# is issued. Reset logic 420 receives and interprets the PGOOD and reset commands from the watchdog timers 400, 410 and delivers the SYSRST# command when appropriate. In addition to transmitting a SYSRST# command, the watchdog device 330 may also be configured to transmit maskable event notification interrupts to the I/O CPU 320 indicating which of the watchdog timers 400, 410 expired and thus initiated the reset procedure.

It should be noted that a reset command from either watchdog timer 400, 410 under normal operating conditions is sufficient to reset the system. Thus, the preferred embodiment provides protection against application failures as well as operating system failures. It should also be noted that the watchdog devices 400, 410 operate independent of one another and each may be selectably enabled or disabled as described below. In addition to a system reset as indicated by the SYSRST# signal shown in FIG. 4, the watchdog device 330 may also initiate alternative reset procedures, such as an operating system reset or an individual application kill/reset procedure.

FIG. 4 also shows early expiration signals that may be issued by the watchdog timers 400, 410. The watchdog timers 400, 410 are configurable to send these early warning signals before the respective timers expire. Warning logic 430 receives the early warning signals and delivers interrupts to the operating system and/or system management software as a warning that the watchdog timer is about to expire. Additionally, the watchdog 330 may also transmit warning interrupts to the I/O CPU 320. These interrupts allow the system to perform any necessary tasks, such as saving a memory context or system information prior to the upcoming system reset. The exact nature of these early expiration interrupts is discussed in more detail below.

Figure 5:
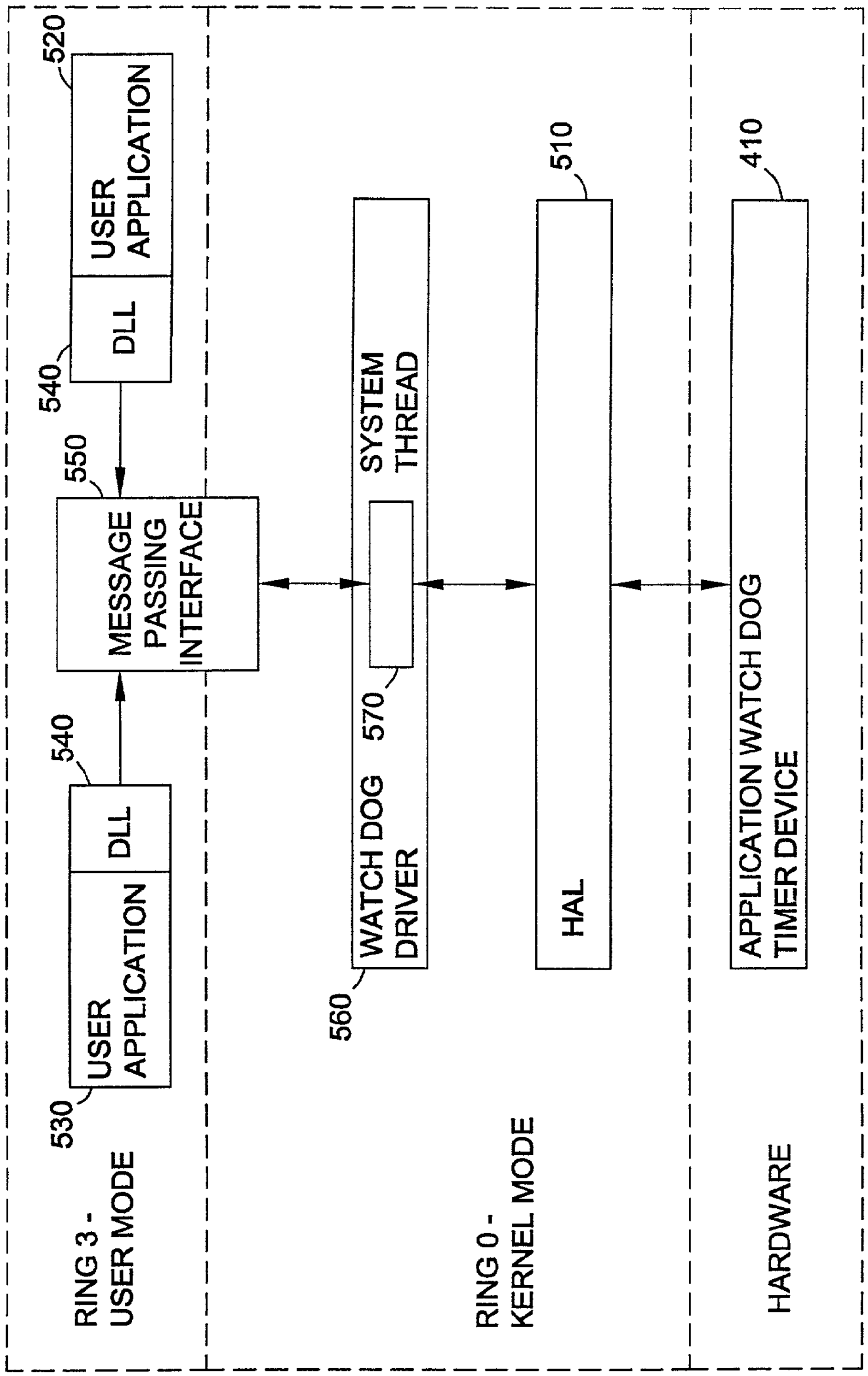
FIG. 5 shows a schematic displaying the hardware and software layer architecture of the preferred embodiment.

Referring now to FIG. 5, a schematic showing the system architecture of the preferred embodiment is shown. The preferred embodiment is described for, but not limited to, a Windows NT environment. The three main levels shown in FIG. 5 represent the hardware/software protection layers in a conventional computer system running the Windows NT operating system. The NT environment provides two software protection levels: Ring 0 and Ring 3. Other systems may provide up to 4 or more protection levels. The Ring 0 protection level, sometimes called the kernel mode or supervisor mode, is the most highly protected ring in which an application or service can run. The Ring 3 protection level, sometimes called the application level or user mode, is the least protected ring. Applications running in Ring 3 cannot physically access memory space in the more highly protected Ring 0 layer. Any communication between applications running in Ring 3 and services in Ring 0 must use a message passing service. This design prevents user applications from interfering with the core NT operating system.

Also shown in FIG. 5 is a Hardware layer, which represents the physical computer system hardware such as the CPUs, timer devices, and watchdog devices. For the purposes of illustrating the preferred embodiment, FIG. 5 shows only the application watchdog timer device 410. Also included in FIG. 5 is a Hardware Abstraction Layer ("HAL") 510, which is used to prevent hardware dependence and provide an isolation layer between the hardware and software. The HAL 510 operates at the Ring 0 level and translates low-level operating system functions into instructions understandable by the physical system hardware.

Another aspect of FIG. 5 that is common to conventional NT system architectures is the location and execution of user applications 520, 530 in the Ring 3 protection layer. As discussed above, the protection levels are set up to ensure a stable operating system environment. In order to provide access to OS functions and data structures, a set of dynamic link libraries ("DLL") 540 are linked as extensions to the applications. The DLLs 540 may be shared between applications 520, 530 or may be uniquely related to a particular application. The applications 520, 530 and DLL 540 are typically linked at application load time. Furthermore, a message passing interface 550 is used to permit communication between the applications 520, 530 in the application layer and kernel mode drivers in the Ring 0 layer. The message passing interface 550 may be implemented as shared memory queues, which transmit communication signals as well as manage any asynchronous inter-layer timing differences.

The above described architecture will now be supplemented with a description of the unique aspects and advantages of the preferred embodiment. Among the required components for the application watchdog is a kernel mode driver 560 with a system thread 570. The system thread 570 processes information from and communicates with the message passing interface 550, which is situated between protection levels. The application watchdog driver 550 mirrors those drivers that already exist in systems that provide a system watchdog driver to monitor the operating system. However, in this preferred embodiment, the clear commands that reset the watchdog timer originate from user level applications 520, 530. These clear commands are interpreted by the system thread 570 in the watchdog driver 560, which then issues a command (via the HAL 510) to clear the timer device 410. Thus, the timer device 410 and watchdog driver 560 shown in FIG. 5 are dedicated to the applications 520, 530.

Figure 6:
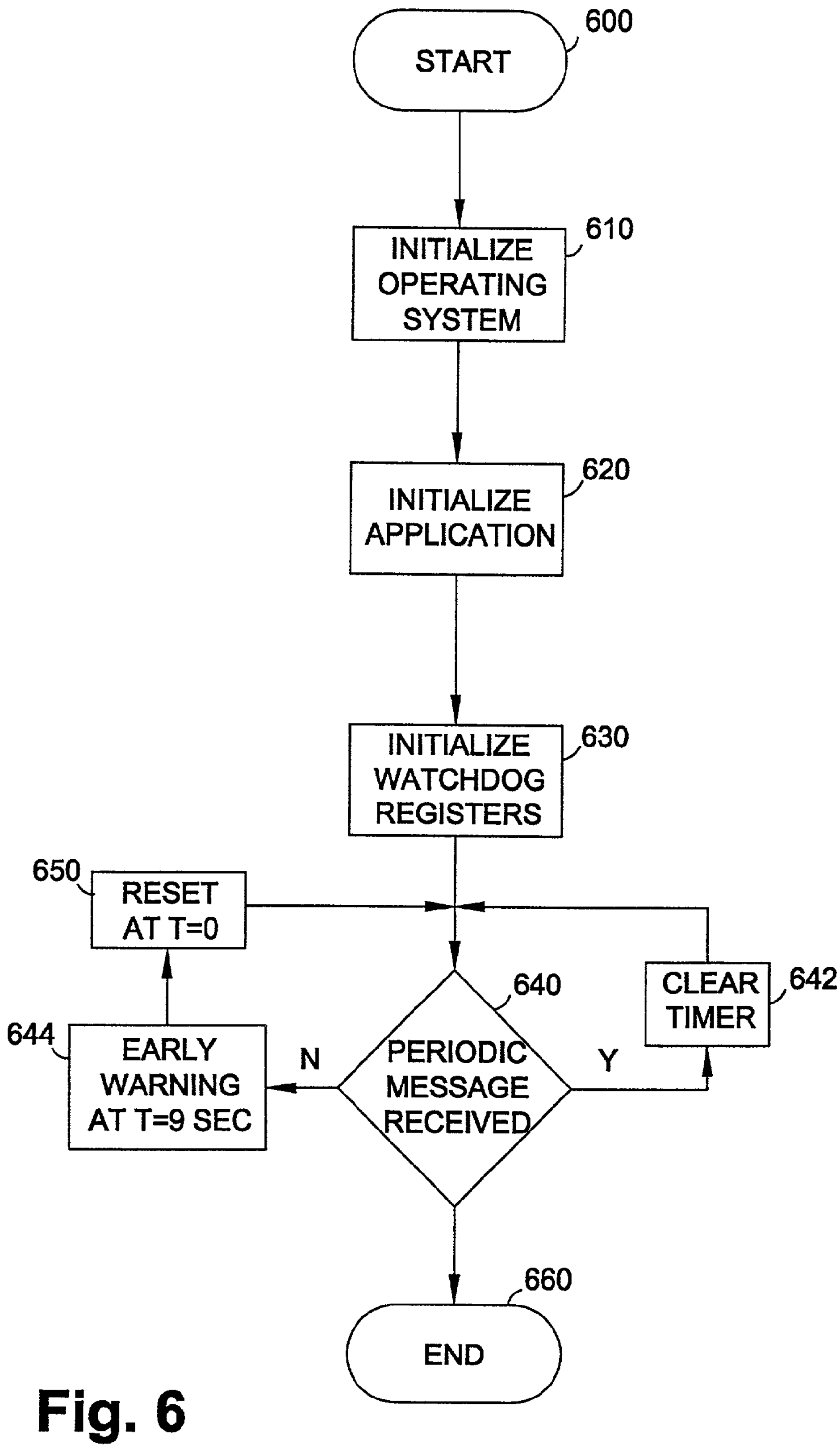
FIG. 6 shows a flow chart describing the initialization and operation of the preferred embodiment.

Referring now to FIG. 6, a simplified flow chart describing the initialization and operation of the preferred embodiment is shown. The following description includes references to the watchdog system architecture as shown in FIG. 5. The START procedure 600 begins during a computer system reset. This reset may be a cold boot, warm boot, or perhaps even a system reset initiated by the system level or application level watchdog timers. After the computer completes the boot operation and executes the POST operation, the operating system will load and initialize 610. During OS initialization 610, the application watchdog driver 560 uses I/O control calls ("IOCTLs") to establish the appropriate message passing interface 550. Once the OS is initialized and running, the key user applications 520, 530 are started and initialized 620.

It is envisioned that the watchdog driver 560 need not monitor all applications, but it is certainly possible to do so. In the preferred embodiment, the key user applications 520, 530 will be designated by the user and only these applications will request watchdog support. Once a key application is linked to an appropriate DLL 540, the application will call into the DLL 540, which in turn, will make initialization IOCTL calls into the watchdog driver 560 to verify a connection through the message passing interface 550. Once this interface is established, no further IOCTL calls will be required. The initialization IOCTL calls will likely have pointers, process id's, and callback addresses associated with the user applications 520, 530. The watchdog driver 560 contains a list and monitors each of the key user applications 520, 530 and clears the watchdog timer 410 when periodic messages are received from all applications in this list.

In addition to the OS initialization 610 and application initialization 620, the application watchdog timer device must be initialized 630. This initialization consists of setting appropriate bits in a timer value register and a control and status register (shown in FIG. 7) within the watchdog device. The timer value register is a 16-bit counter that counts down to a system reset. The control and status register is an 8-bit configuration register that enables the application watchdog and the early expiration warning interrupts. The control and status register also includes a timer reset field. The timer value register is initialized by writing the initial count value. The control and status register is initialized by setting an enable bit and optionally setting an early warning enable bit. Additional information regarding the register contents is provided below.

During runtime operation the user application sends messages periodically through the message passing interface 550. The watchdog driver system thread 570 will asynchronously monitor the interface 550 for periodic messages from the applications 520, 530. If the watchdog driver 560 detects messages 640 from all applications 520, 530, the driver 560 issues the clear command 642 to the watchdog timer 410 and continues monitoring the shared memory queues 550 for the periodic messages. If the watchdog driver 560 does not detect a message from either of the applications 520,530 for a predetermined period of time, the driver 560 withholds the timer clear signal. As the watchdog timer 410 reaches the 9 second early warning threshold, the watchdog driver 560 issues the appropriate early warning signals 644. If the watchdog counter expires, the driver 560 issues a reset command 650. In other words, the watchdog driver 560 must receive signals from all registered applications 520, 530 before the watchdog clear command is issued to the watchdog timer 410. This process continues until the application 520, 530 is manually closed down or the computer system or operating system is shut down 660. A graceful termination of the application 520, 530 will not induce any watchdog events because the application de-registers from the watchdog list monitored by the driver 560. In the event of an operating system shutdown, or computer system shutdown, the operating system issues commands to the application to shut down. In response, the application 520, 530 de-registers from the watchdog list. That is, the application 520, 530 directs the watchdog driver 560 to remove that program's registration entry so that the watchdog driver 560 no longer looks for periodic messages from that application 520, 530. If all applications 520, 530 terminate, the watchdog list becomes null and the watchdog timer 410 itself is preferably disabled.

It is envisioned that the periodic signals sent by the applications 520, 530 will be initiated by commands embedded in the computer application software. These commands will be directed at the shared memory queues 550 for the purpose of clearing the application watchdog timer. It is feasible however, that the commands be sent by instructions in the DLL 540 or as part of normal communication with other parts of the computer including the CPUs, system memory, or the OS. In this case, the watchdog driver system thread 570 acts as a passive observer checking for activity from the applications 520, 530. Other embodiments in accordance with the above teachings are certainly feasible.

Referring now to FIG. 7, the contents of the application watchdog timer value register 700 and control/status register 710 are shown. As mentioned above, the timer value register is a countdown register that decrements from an initial value to a final system reset value. The register is 16-bits wide and each bit represents 128 msec. Thus, the timer, once enabled, will decrement every 128 msec unless the timer is cleared. When this timer reaches zero, the reset signal is asserted. The 16-bit register yields a range of 128 msec to approximately 140 minutes. Writes to this register set the initialization start value for the timer. Reads of the register return the current timer value in 128 msec units.

The control/status register 710 is an 8-bit register and contains at least 6 used bit fields. As discussed above, the enable bit enables the timer countdown sequence. Setting this bit will automatically clear the timer to the value programmed in the timer value register. The reload bit is a timer clear bit. Writing a one to this location will reload the timer with its initialization value. This bit is self clearing. The NMIEN and SMIEN bits enable different early expiration warning interrupts. In the preferred embodiment, the NMIEN bit is used to enable the generation of warning NMI (non-mask interrupt) whenever the timer reaches 9 seconds from expiration. If enabled, the NMISTAT bit is used by system management software to detect that the application watchdog timer is about to expire. Similarly, the SMIEN bit is used to enable the generation of a warning SMI# (system management interrupt) signal when the timer reaches 9 seconds from expiration. If enabled, the SMISTAT bit is used by SMM (system management mode) firmware to detect that the timer is about to expire. Bit locations 4 and 5 are reserved for features not presently incorporated in the preferred embodiment, but may be used for other interrupt signals, including maskable interrupts. In general, the early warning interrupt may be any suitable maskable, non-maskable or system management interrupt.

As mentioned above, the watchdog 330 may be additionally configured to transmit event notification interrupts to the I/O CPU 320 residing on the ASM ASIC 230. The I/O CPU 320, which operates independently of the main CPU 202 and operating system, may wish to monitor these system events for the purpose of logging or transmitting system management notification alerts. If desired, these event notification interrupts may be configured and initialized much like the NMI and SMI interrupts described above. For instance, a mask register may be used to enable early warning notification and system reset notification interrupts for each watchdog. Hence, for each watchdog (application and system), the mask register may include a bit to enable early warning notifications and a separate bit to enable system reset notifications. Similarly, an event status register comprising corresponding bits may be used to indicate if the early warning or reset time periods expire for either watchdog.

It should also be noted that the 9 second early expiration warning is set for practicality and convenience reasons. There is no reason why this period cannot be extended or shortened to other periods of time. Furthermore, this time period is preferably hard coded into the registers, but it is also envisioned that the expiration time may be altered via a user-interactive software menu.

The above discussion is meant to be illustrative of the principles and various embodiments of the present invention. Numerous variations and modifications will become apparent to those skilled in the art once the above disclosure is fully appreciated. For example, since the watchdog driver 560 is capable of monitoring several applications, the watchdog system may be configured to provide a user interface to establish priority among the applications. For instance, some sort of policy control may be added that allows the alarm timer events to be delayed more for one application compared to others. This will provide some measure of certainty to ensure that an application has hung before it is restarted. It is intended that the following claims be interpreted to embrace all such variations and modifications.

What is claimed is:

1. A computer system, comprising at least one processor, a system memory coupled to said processor, at least one input/output device coupled to said processor, and a watchdog timer device, wherein the computer system executes:

an operating system with at least two protection layers;

one or more computer applications; and an application watchdog driver that monitors user designated computer applications for periodic messages;

wherein if the watchdog driver receives a periodic message from all user-designated computer applications in a predetermined period of time, the watchdog driver delivers a command to clear the watchdog timer device;

a message passing interface that transmits signals between the two protection layers; and wherein the watchdog driver executes in one protection layer and the application executes in another protection layer and wherein the periodic message is transmitted from the application to the application watchdog driver through the message passing interface.

2. The computer system of claim 1 wherein:

the message passing interface is a shared memory queue.

3. The computer system of claim 1 wherein:

the watchdog timer device resides in a hardware layer separate from the operating system protection layers and wherein the application watchdog driver communicates with the watchdog timer device via a hardware abstraction layer.

4. The computer system of claim 1 further comprising a system watchdog timer device;

wherein the computer system also executes a system watchdog driver that monitors the operating system for periodic messages; and wherein if the system watchdog driver receives a periodic message from the operating system in a predetermined period of time, the system watchdog driver delivers a command to clear the system watchdog timer device.

5. The computer system of claim 4 wherein:

the watchdog timer devices issue a reset command if either of the watchdog timer devices do not receive a clear timer command from the watchdog drivers in a predetermined period of time.

6. An application watchdog, comprising a dedicated watchdog counter in the hardware layer of a computer system, and a watchdog driver operating in the kernel mode of the computer operating system, the watchdog driver comprising:

a system thread configured to monitor a plurality of designated user applications operating in the user mode of the computer operating system;

a message passing interface for receiving periodic signals from each of the user applications; and a communication interface for transmitting a timer reset command to the dedicated watchdog counter;

wherein if the system thread receives a message from each of the designated user applications within an allotted period of time, the watchdog driver sends a timer reset command to the dedicated watchdog counter and wherein if the system thread does not receive a message from each of the designated user applications within the allotted period of time, the watchdog driver does not send a timer reset command to the dedicated watchdog counter.

7. The application watchdog of claim 6 wherein:

if the watchdog counter does receive a timer reset command from the watchdog driver, the counter is reset to begin counting down from the maximum allotted period of time and wherein if the watchdog counter does not receive a timer reset command from the watchdog driver, the counter is configured to restart the computer system when the counter expires.

8. The application watchdog of claim 6 wherein:

the messages from the designated user applications are sent periodically by the applications and directed specifically to the watchdog driver.

9. The application watchdog of claim 6 wherein:

the plurality of the user applications are prioritized by a computer user to permit varying levels of watchdog protection.

10. The application watchdog of claim 6 wherein:

the application watchdog operates in conjunction with a system watchdog that is configured to monitor the computer operating system for periodic activity; and wherein both the application watchdog and the system watchdog are sufficiently configured to restart the computer system if either watchdog does not receive a timer reset command within an allotted period of time.

11. An application watchdog, comprising a dedicated watchdog counter in the hardware layer of a computer system, and a watchdog driver operating in the kernel mode of the computer operating system, the watchdog driver comprising:

a system thread configured to monitor a plurality of designated user applications operating in the user mode of the computer operating system;

a message passing interface for receiving periodic signals from each of the user applications; and a communication interface for transmitting a timer reset command to the dedicated watchdog counter;

wherein if the system thread receives a message from each of the designated user applications within an allotted period of time, the watchdog driver sends a timer reset command to the dedicated watchdog counter and wherein if the system thread does not receive a message from each of the designated user applications within the allotted period of time, the watchdog driver does not send a timer reset command to the dedicated watchdog counter;

wherein, if the watchdog counter does receive a timer reset command from the watchdog driver, the counter is reset to begin counting down from the maximum allotted period of time and wherein if the watchdog counter does not receive a timer reset command from the watchdog driver, the counter is configured to restart the computer system when the counter expires wherein the watchdog counter further comprises, a timer value register that stores a digital representation of the maximum allotted period of time; and a control and status register that comprises:

a bit for enabling the application watchdog:

a bit for counter reset;

bit fields for enabling early expiration warnings; and bit fields for early expiration warning signals;

wherein if the watchdog counter does not receive a timer reset command from the watchdog driver and the early expiration warnings are enabled, the counter is configured to transmit early expiration warnings to the rest of the computer system before the counter expires.

12. The application watchdog of claim 11 wherein:

the early warning messages are non-mask interrupts.

13. The application watchdog of claim 11 wherein:

the early warning messages are maskable interrupts.

14. The application watchdog of claim 11 wherein:

the early warning messages are system management interrupts.

15. A method of detecting and restarting an unresponsive computer application, comprising:

executing the application in a first protective layer of a computer operating system;

executing an application watchdog driver in a second, more protected, protective layer of the computer operating system;

establishing a message passing interface between the application and the watchdog driver;

periodically transmitting signals from the application to the message passing interface;

executing a system thread in the watchdog driver that is configured to monitor the message passing interface for the periodic signals from said application or other designated applications; and using a dedicated watchdog timer device to count from a programmable initial value to a final system reset value;

wherein if the system thread detects a periodic signal from the application before the watchdog timer counts to the final system reset value, the watchdog driver initiates a command to the watchdog timer to reset the watchdog timer to the initial value and wherein if the system thread fails to detect a periodic signal from the application before the watchdog timer counts to the final system reset value, the watchdog timer initiates a command to restart the computer system.

16. The method of claim 15 further comprising:

sending an early warning message to notify system management software or firmware that the watchdog timer is about to expire.

17. The method of claim 15 wherein the initialization of the watchdog driver comprises:

loading the watchdog driver as the operating system loads following a computer system boot; and loading and creating an initial input/output control signal interface that establishes the message passing interface.

18. The method of claim 17 wherein the initialization of the computer application comprises:

linking the application with a dynamic link library:

calling the watchdog driver via the dynamic link library and through the initial input/output control signal interface to validate the message passing interface; and sending application location and identification information to the watchdog driver.

19. The method of claim 18 wherein the initialization of the watchdog timer device comprises:

setting the timer initialization value in a timer value register in the watchdog timer device; and setting the counter enable bit and early warning enable bits in a control/status register in the watchdog timer device.

20. The method of claim 15 wherein:

the system thread must detect a periodic signal from all designated applications before initiating the command to the watchdog timer to reset the watchdog timer to the initial value.

21. A method of detecting and restarting an unresponsive computer application, comprising:

executing the application in a first protective layer of a computer operating system;

executing an application watchdog driver in a second, more protected, protective layer of the computer operating system;

establishing a message passing interface between the application and the watchdog driver;

periodically transmitting signals from the application to the message passing interface;

executing a system thread in the watchdog driver that is configured to monitor the message passing interface for the periodic signals from said application or other designated applications;

using a dedicated watchdog timer device to count from a programmable initial value to a final system reset value;

wherein if the system thread detects a periodic signal from the application before the watchdog timer counts to the final system reset value, the watchdog driver initiates a command to the watchdog timer to reset the watchdog timer to the initial value and wherein if the system thread fails to detect a periodic signal from the application before the watchdog timer counts to the final system reset value, the watchdog timer initiates a command to restart the computer system;

sending an early warning message to notify system management software or firmware that the watchdog timer is about to expire; and the early warning messages are NMI and SMI interrupts that are sent 9 seconds before the watchdog timer device expires.

22. A computer server, comprising:

a central processing unit ("CPU") configured to execute an operating system and designated user applications;

a system memory coupled to said CPU;

an input/output processor ("IOP") configured to control server management architecture;

a system watchdog device configured to receive periodic messages from the operating system; and an application watchdog device configured to receive periodic messages from the user applications;

wherein if either the system watchdog device or the application watchdog device does not receive a periodic message for a designated period of time, the watchdog device that does not receive the periodic messages initiates a command to the CPU to reset the server.

23. The computer server of claim 22 wherein:

the system watchdog and application watchdog may be selectably enabled or disabled independent of one another.

24. The computer server of claim 23 wherein:

the watchdog devices are selectably configured to transmit an early warning interrupt to the CPU before the watchdog device initiates the server reset command.

25. The computer server of claim 23 wherein:

the watchdog devices are selectably configured to transmit an early warning notification to the IOP before the watchdog device initiates the server reset command.

26. The computer server of claim 23 wherein:

the watchdog devices are selectably configured to transmit an event notification to the IOP when the watchdog device initiates the server reset commend.

* * * * *

UNITED STATES PATENT AND TRADEMARK OFFICE

CERTIFICATE OF CORRECTION

PATENT NO. : 7,003,775 B2
APPLICATION NO. : 09/932541
DATED : February 21, 2006
INVENTOR(S) : John Lacombe et al.

It is certified that error appears in the above-identified patent and that said Letters Patent is hereby corrected as shown below:

In column 1, line 41, delete ‘‘Modem” and insert -- Modern --, therefor.

In column 2, line 13, delete “modem” and insert -- modern --, therefor.

In column 2, line 41, after “with a” insert -- system --.

In column 3, line 46, after “value” insert -- register --.

In column 5, line 31, delete “P/O” and insert -- I/O --, therefor.

In column 12, line 45, in Claim 11, delete “watchdog:” and insert -- watchdog; --, therefor.

In column 13, line 33, in Claim 18, delete “library:” and insert -- library; --, therefor.

In column 14, line 57, in Claim 26, delete “commend.” and insert -- command. --, therefor.

Signed and Sealed this

Seventh Day of April, 2009

John Doll

JOHN DOLL
*Acting Director of the United States Patent and Trademark Office*